G. F. DAVIS.
CUTTING OR BLANKING DIE.
APPLICATION FILED JAN. 8, 1916. RENEWED APR. 18, 1919.

1,321,896.

Patented Nov. 18, 1919.

Witnesses

Inventor
G. F. Davis
By
Attys

UNITED STATES PATENT OFFICE.

GEORGE F. DAVIS, OF MONTREAL, QUEBEC, CANADA.

CUTTING OR BLANKING DIE.

1,321,896.  Specification of Letters Patent.  Patented Nov. 18, 1919.

Application filed January 8, 1916, Serial No. 70,979. Renewed April 18, 1919. Serial No. 291,173.

*To all whom it may concern:*

Be it known that I, GEORGE F. DAVIS, a citizen of the United States, and resident of the city of Montreal, in the Province of Quebec and Dominion of Canada, have invented certain new and useful Improvements in Cutting or Blanking Dies, of which the following is a full, clear, and exact description.

This invention relates broadly to improvements in cutting or blanking dies, and particularly to composite dies having the curved cutting edges thereof meeting.

The object of the invention is to provide a composite die in which the various parts thereof are securely and inseparably connected in their curved portions, without thickening of the material to a degree which renders the escape of the cuttings difficult or impossible.

In cutting objects with curved outlines, such as boot heels, disks and the like, I have found it practically impossible to satisfactorily connect dies in the curved portion of their cutting edges in such a way that the curved cutting edge of one die touches the curved cutting edge of the other. The result has been that as a rule, a single die is used, and where rapidity is required several thicknesses of material have been superposed and cut simultaneously, which obviously requires a greater expenditure of power and subjects the die to greatly increased stress, and also causes an inferior product in that the upper layers compress under the die and the cuttings have burred edges. If several dies are mounted for simultaneous operation, it is necessary to give the dies a clearance, thus leaving spaces in the material between the cuttings. The endeavor is naturally made to position the material for the next cut so that as little material will be lost as possible, theoretically so that the outlines touch. The result is that the outlines frequently overlap, so that the proper outline of one cutting is broken. In any event, a considerable loss of material ensues. I have attempted to secure two dies together at their curved edges by reducing the thickness of each and brazing or otherwise securing the two dies together. It has been found that this method is impracticable as each die is so weakened that it breaks very easily at or near the joint. In order to retain sufficient material to overcome this breakage, the die must be thickened very abruptly back of the cutting edge, with the result that it is extremely difficult to clear the cuttings and the dies will become completely clogged and the operation must be stopped frequently to clear same.

According to this invention, a die is provided composed of parts connected at their curved cutting edges, so that the edges touch, and formed of a single piece of metal so that there is no weakening of the material, while at the same time maintaining the material behind the meeting edges sufficiently thin to give easy clearance for the cuttings.

In the drawings which illustrate the invention:—

Figure 1:
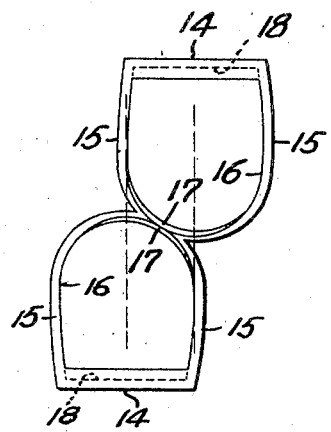
Figure 1 is a plan view of a completed die.

In the drawings just mentioned, the die shown is one used for cutting boot heel lifts, but it will be understood that the invention is in no way limited to this particular die, as it may be applied to a wide range of dies having curved cutting edges. The present die has been chosen as an illustration merely because it is the simplest form combining curved and straight edges, and forms an excellent illustration.

Figure 2:
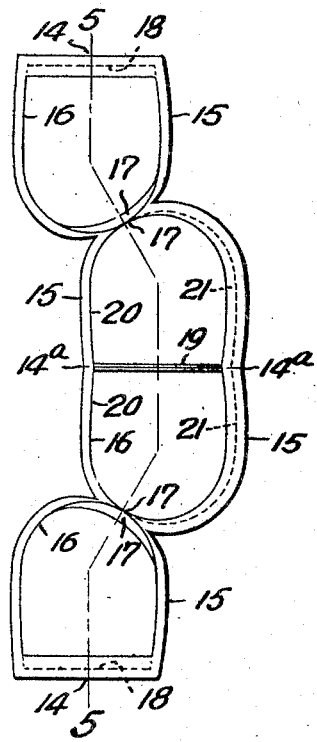
Fig. 2 is a plan view of a larger composite die made similarly to that in Fig. 1.
Figure 3:
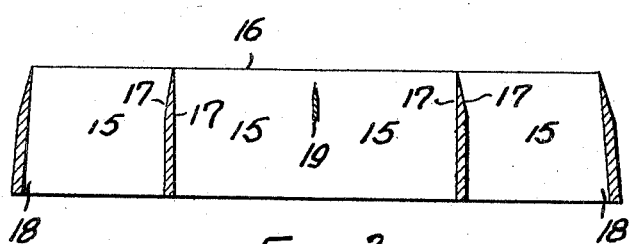
Fig. 3 is a section on the line 5—5, Fig. 2.

The die which, according to this invention, is essentially composed of a single piece of metal formed into integral parts, has walls of substantially uniform thickness, circumferentially, which merge into each other at the junction of the parts, as clearly shown. If the nature of the use will permit, the merged portion of the walls may be thinner than the rest. Adjacent surfaces of the side portions 15 are parallel or diverge slightly from the cutting edge 16 to the base. At the junction of the two die parts, the inner surfaces converge from the bottom of the die to the cutting edge, as is necessary owing to the thickness of the material. This is clearly shown at 17, and it is obvious that the thinner the material is at this point, the less resistance there will be to the escape of cuttings. In order to provide for the clearance of the material and the edgewise movement imparted by the surface 17, the inner surface of the die opposite the surface 17 falls away behind the cutting edge, as clearly indicated at 18, so that easy movement of the cutting is permitted and the die readily clears itself. This enlargement of a die opening back of the cutting edge is readily understood, and will need no further explanation. At the junction of the die parts the curved cutting edges meet accurately, so that no appreciable flat surface is formed which would offer resistance to the passage of the die through the material, nor is there any passage left between the cutting edges. The meeting is accurate and conforms as nearly as practicable with the geometric definition that two meeting arcs touch at a point only. From this point, the material falls away to the base in the angles between the parts as sharply and smoothly as possible, so as to prevent jamming of waste material.

Where dies having one straight side are required, it is possible to construct the dies so that the straight edges of two adjoining dies coincide. When only two dies are connected and at their straight edges, it is possible to undercut the curved portion of the die opposite the straight edge to give clearance for the cutting in exactly the same way that the straight side of the die is undercut at 18, as just described. When, however, die pairs connected at their curved edges, as in Fig. 1, are used, it is impossible to have a complete division wall under the straight edge, as the die opening would then contract away from the cutting edge in place of enlarge. Therefore, in the case of four or more dies, as shown in Fig. 2, the straight cutting edge common to both dies is formed by an inserted knife 19 of least possible thickness, which is set with its cutting edge some distance back from the remaining cutting edge of the die, as clearly shown in Fig. 3. At the same time, the surface portions 17 and 20 of the two inner dies are made as nearly perpendicular to the plane of the cutting edges as possible and the slope of the surfaces 17 of the outer dies made considerably greater than in Fig. 1, the undercutting at 18 being correspondingly increased. From at least the longitudinal axis of the two central dies, the clearance is compound, commencing longitudinally and finishing laterally and is obtained by undercutting the opposite side surface 21, and extending as far as the intersection point 17 as clearly shown, so that the cutting in this central double die clears in a substantially lateral direction, while the cuttings in the two end dies clear in a longitudinal direction. In point of fact, the slope for clearance is commenced as close to the point of curved edge intersection as possible, so as to allow for slight longitudinal movement of the cuttings due to the thickness of the knife 19. The first cutting is completely severed from the sheet, and is theoretically just bearing against the knife 19. As it divides from the knife 19, this cutting is obviously free to move in opposite directions, which would not be the case if the knife 19 cut simultaneously with the circumferential cutting edge. As the second cutting enters the die, it forces the first cutting against the knife 19, and the two parts of the cutting being unable to expand in a directly longitudinal direction are forced by the curvature of the surfaces into a partly lateral direction, where the necessary clearance is afforded. When a die of the character shown in Fig. 2 is formed with more than four parts, it will obviously be necessary to distribute the wall thickness under the meeting of curved edges symmetrically, as shown in Fig. 1, except at the two extreme end sections.

I have found that great economy results from the particular arrangement of dies shown, that is, an arrangement in which the axis of one die is in line with the side edge of the adjoining die. Coupled with the particular arrangement of dies and coöperating therewith in effecting the economy of material, is the composite die which automatically reduces loss of material between the cuttings common with single dies to a minimum.

One of the strongest features of my device from a manufacturing point of view is that of combined strength and freedom of clearance. Two separate dies have been thinned at the point of contact and brazed to give the freedom of clearance, but the structure is not sound, and soon one or the other of the dies breaks in the thinned part. Requisite strength necessitates increased thickness and sacrifices freedom of clearance.

The new result achieved is the absolute elimination of waste and at the same time the absolute prevention of overlapping cuts, the units of the die being of course multiplied in practice. In cutting such soft materials as leather, if single dies are used, the dies must be set back from the edge of the previous cut a small amount, since if the die is set exactly on the edge, so that one portion of it makes no cut, the resistance is unequal, and the die will inevitably move a trifle sidewise, so that the contour of the new cutting is slightly irregular. This has been long recognized, and the skill of the operator consists in adjusting the amount of waste to a hair's breadth, for the simple reason that a satisfactory die having two curved cutting edges meeting as in this invention had not been produced. If a die was made according to known methods, in which the two curved edges met, the necessary clearance of metal behind the cutting edge was so great as to make the die unworkable. The thinness of material back of the meeting or cutting edges is not of very great importance in working soft materials, such as leather for gloves or shoe uppers, unless a great number of thicknesses are cut at once, but for working hard material, such as sole leather, which is nearly incompressible, this thinness is essential if the die is to last more than a few cuts.

The prior art discloses only dies with curved edges which come together and then continue coincident. The manufacture of such a die presents no great difficulties and the question of clearance of the cuttings is readily solved. Formerly, it has been practical to make boot heel or similar dies in pairs. These dies were placed on the leather and the cuttings made but there was a waste of material entirely around each die necessitated by the fact that if the edge of the die were set exactly on the line of the previous cut, the result would be an imperfect or incomplete product. In other words, waste could be eliminated at the expense of an imperfect product. The die according to this invention eliminates a great part of this waste. When made up in multiple, it eliminates absolutely all waste of imperfect product and as a result of the closer spacing of the dies, automatically eliminates a part of the waste from the previously necessary spacing of the dies. The new result expressed in figures makes nearly 10% more cuttings possible from a sheet than is possible with a die of the old type, and an increase of up to 20% in the rate of output. The increase in number and rate varies according to the size of the piece operated on. Increase in rate is due solely to the fact that the dies can be connected in infinite numbers, whereas heretofore, only two could be connected.

Having thus described my invention, what I claim is:—

1. A composite die comprising a plurality of heel cutting dies arranged in juxtaposition with the curved portion of one die extending beyond the curved portion of the other die and with the axis of one die in line with the cutting edge of the companion die, and said dies meeting at a common cutting point.

2. The composite die of claim 1 with said dies being integral at their common cutting point.

3. A composite die comprising a plurality of heel cutting dies having portions of their cutting edges in common, and compound clearance means for the blanks extending first in one direction and then in another.

In witness whereof, I have hereunto set my hand, in presence of two witnesses.

GEORGE F. DAVIS.

Witnesses:
S. R. W. ALLEN,
C. W. TAYLOR.